United States Patent
Govindaraj et al.

(10) Patent No.: US 10,481,610 B2
(45) Date of Patent: Nov. 19, 2019

(54) METHOD AND DEVICE FOR CONTROLLING AN AUTONOMOUS VEHICLE USING LOCATION BASED DYNAMIC DICTIONARY

(71) Applicant: WIPRO LIMITED, Bangalore (IN)

(72) Inventors: Balaji Govindaraj, Chennai (IN); Bharath Kumar Muthupandian, Sivagangai (IN); Sujatha Jagannath, Bangalore (IN); Ramachandra Budihal, Bangalore (IN)

(73) Assignee: Wipro Limited, Bangalore (IN)

( * ) Notice: Subject to any disclaimer, the term of this patent is extended or adjusted under 35 U.S.C. 154(b) by 126 days.

(21) Appl. No.: 15/719,643

(22) Filed: Sep. 29, 2017

(65) Prior Publication Data

US 2019/0056747 A1    Feb. 21, 2019

(30) Foreign Application Priority Data

Aug. 18, 2017    (IN) .............................. 201741029370

(51) Int. Cl.
| | |
|---|---|
| *G05D 1/02* | (2006.01) |
| *G05D 1/00* | (2006.01) |
| *G06K 9/78* | (2006.01) |
| *G06K 9/62* | (2006.01) |
| *G06K 9/34* | (2006.01) |

(Continued)

(52) U.S. Cl.
CPC ......... *G05D 1/0246* (2013.01); *G05D 1/0088* (2013.01); *G05D 1/0221* (2013.01); *G06K 9/00818* (2013.01); *G06K 9/344* (2013.01); *G06K 9/6202* (2013.01);

(Continued)

(58) Field of Classification Search
CPC .. G05D 1/0246; G05D 1/0221; G05D 1/0088; G08G 1/09623; G06K 9/00818; G06K 9/6256; G06K 9/344; G06K 9/78; G06K 9/6202; G06K 2209/01
See application file for complete search history.

(56) References Cited

U.S. PATENT DOCUMENTS

| | | | |
|---|---|---|---|
| 2013/0034295 A1* | 2/2013 | Tsuchinaga | .......... G06K 9/6857 382/153 |
| 2018/0282955 A1* | 10/2018 | McClendon | .......... E01C 23/222 |

OTHER PUBLICATIONS

Desai, S., et al., "Optical character recognition using template matching and back propagation algorithm", 6 pages.

(Continued)

*Primary Examiner* — Rodney A Butler
(74) *Attorney, Agent, or Firm* — Finnegan, Henderson, Farabow, Garrett & Dunner, LLP

(57) ABSTRACT

A method and device are described for controlling a vehicle using a location based dynamic dictionary. The method includes receiving, by a navigation device, an image from an image sensing device associated with the autonomous vehicle, wherein the image sensing device captures the image at a location of the autonomous vehicle. The method includes extracting, by the navigation device, navigation content from the image. The method further includes identifying, by the navigation device, the navigation content from the image by comparing the navigation content from the image with a dynamic dictionary. The dynamic dictionary is created based on the location of the autonomous vehicle. The method further includes controlling, by the navigation device, the autonomous vehicle based on the navigation content.

17 Claims, 6 Drawing Sheets

System diagram

(51) Int. Cl.
G06K 9/00 (2006.01)
G08G 1/09 (2006.01)
G08G 1/0962 (2006.01)

(52) U.S. Cl.
CPC ............ *G06K 9/6256* (2013.01); *G06K 9/78* (2013.01); *G08G 1/09623* (2013.01); *G06K 2209/01* (2013.01)

(56) References Cited

OTHER PUBLICATIONS

Gonzalez, A., et al., "Text Detection and Recognition on Traffic Panels from Street-Level Imagery Using Visual Appearance", *IEEE Transactions on Intelligent Transportation Systems*, vol. 15, No. 1, Feb. 2014. pp. 228-238.

Guo, C., et al., "A Japanese OCR Post-Processing Approach based on Dictionary Matching", *IEEE, Proceedings of the 2013 International Conference on Wavelet Analysis and Pattern Recognition*, Jul. 14-17, 2013, pp. 22-26.

Hoch, R., et al., Using a Partitioned Dictionary for Contextual Post-Processing of OCR-Resuits, *IEEE*, 1994, pp. 274-278.

Ma, L., et al., "On-line Handwritten Chinese Character Recognition Based on Nested Segmentation of Radicals", *IEEE*, 2009, pp. 1-5.

Ma, L., et al., "On-line Handwritten Chinese Character Recognition Based on Inter-Radical Stochastic Context-Free Grammar", *IEEE World Congress on Computational Intelligence*, Jun. 10-15, 2012, pp. 1-5.

Strohmaier, C.M., et al., "Lexical Postcorrection of OCR-Results: The Web as a Dynamic Secondary Dictionary?", *IEEE Proceedings of the Seventh International Conference on Document Analysis and Recognition*, 2003, 5 pages.

\* cited by examiner

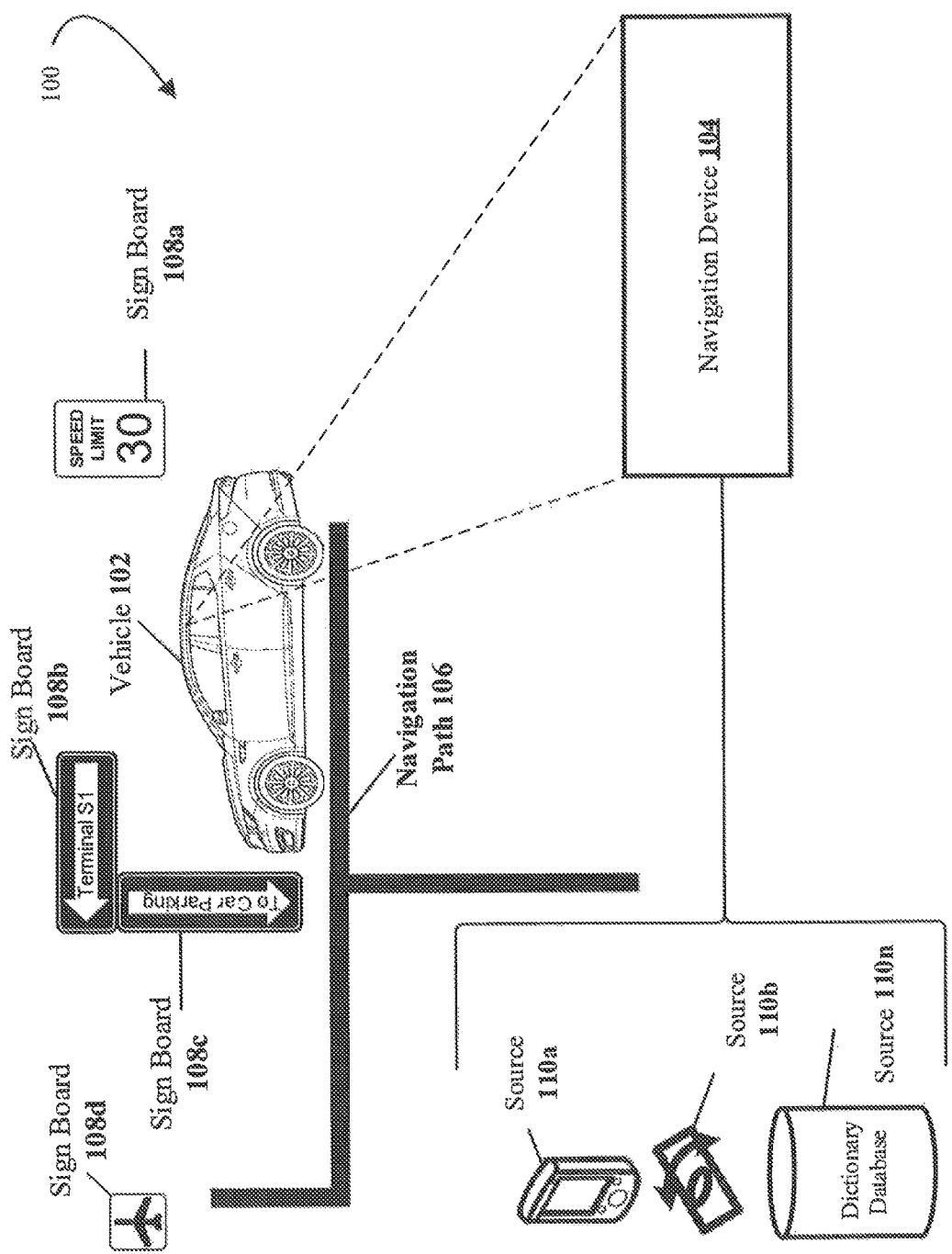
FIG 1. System diagram

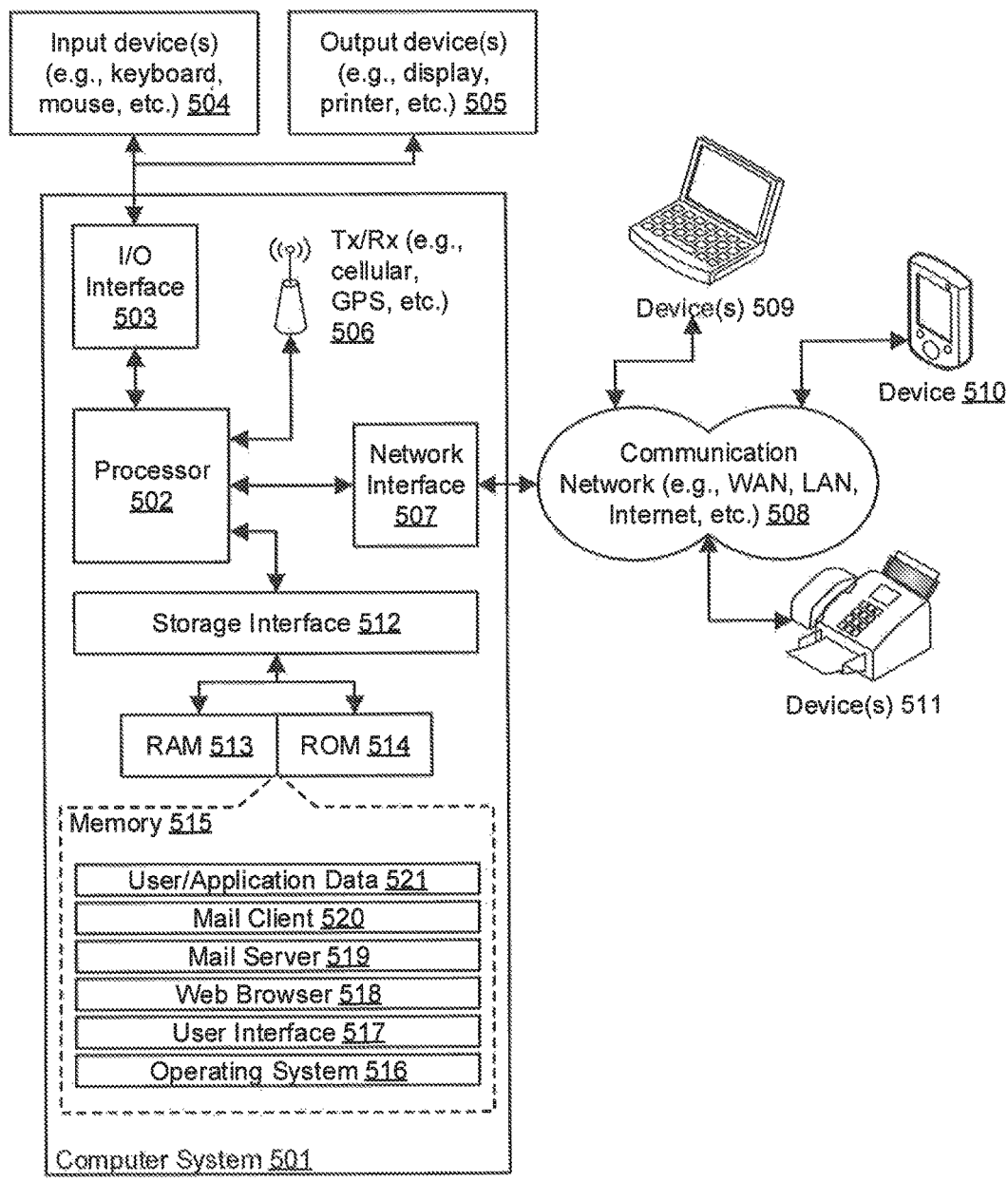
FIG. 5: Example Computer System

METHOD AND DEVICE FOR CONTROLLING AN AUTONOMOUS VEHICLE USING LOCATION BASED DYNAMIC DICTIONARY

TECHNICAL FIELD

The present subject matter is related, in general, to autonomous vehicles and more particularly, but not exclusively to method and device for controlling an autonomous vehicle using a location based dynamic dictionary.

BACKGROUND

Identifying and inferring navigation information available on signboards by the side of a road is essential for a control system of an autonomous vehicle. For any autonomous vehicle, intelligently identifying forthcoming signs, inferring the information therein and providing accurate inputs to the control system of the vehicle is critical during navigation. This identified information may help the control system of the autonomous vehicle to guide it correctly similar to human driving. However, the speed and movement of the vehicle, camera field of view (FOV) and the accuracy of imaging-device (e.g. camera) may impact the recognition of the signboard. For example, if an autonomous vehicle is to make a correct decision based on a signboard, the vehicle will need to recognize or identify the signboard in the shortest time possible. In real-time, any delays in recognizing the signboard may lead to consequences such as traffic build up or accidents.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, a method of controlling an autonomous vehicle is disclosed. The method may include receiving, by a navigation device, an image from an image-sensing device associated with the autonomous vehicle. The image may be captured by the image-sensing device at a location of the autonomous vehicle. The method may include, extracting, by the navigation device, navigation content from the image and comparing the navigation content with a dynamic dictionary. The navigation content may be identified based on the comparison with the dynamic dictionary. The dynamic dictionary may be dynamically created based on the location of the autonomous vehicle. The method may further include controlling, by the navigation device, the autonomous vehicle based on the navigation content.

According to embodiments illustrated herein, a navigation device, to control an autonomous vehicle based on a dynamic dictionary is disclosed. The navigation device may comprise a processor and a memory communicatively coupled to the processor. The memory may store instructions which may cause the processor to receive an image from an image sensing device associated with the autonomous vehicle. The image may be captured by the image-sensing device at a location of the autonomous vehicle. The memory may further store instructions to extract navigation content from the image. The memory may also store instructions to identify the navigation content from the image by comparing the navigation content from the image with a dynamic dictionary. Further, the memory may store instructions to dynamically create the dynamic dictionary based on the location of the autonomous vehicle. Further, the memory may store instructions to control the autonomous vehicle based on the navigation content.

Disclosed herein is a non-transitory computer-readable storage medium having stored thereon, a set of computer-executable instructions for causing a computer comprising one or more processors to perform steps of receiving an image from an image-sensing device associated with the autonomous vehicle. The image may be captured by the image-sensing device at a location of the autonomous vehicle. The computer-executable instructions may include instructions to extract navigation content from the image. The computer-executable instructions may also include instruction to identify the navigation content from the image by comparing the navigation content from the image with a dynamic dictionary. Further computer-executable instructions may also include instructions wherein the dynamic dictionary is dynamically created based on the location of the autonomous vehicle. The computer-executable instructions may further include instructions to control the autonomous vehicle based on the navigation content.

The foregoing summary is illustrative only and not intended to be limiting in any way. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device and/or system and/or methods in accordance with embodiments of the present subject matter are now described, by way of example only, and with reference to the accompanying figures.

FIG. 1 is a block diagram illustrating an example system environment in which various embodiments of the present disclosure may function.

FIG. 5 is a block diagram illustrating an exemplary computer system for implementing embodiments consistent with the present disclosure.

Figure 2A:
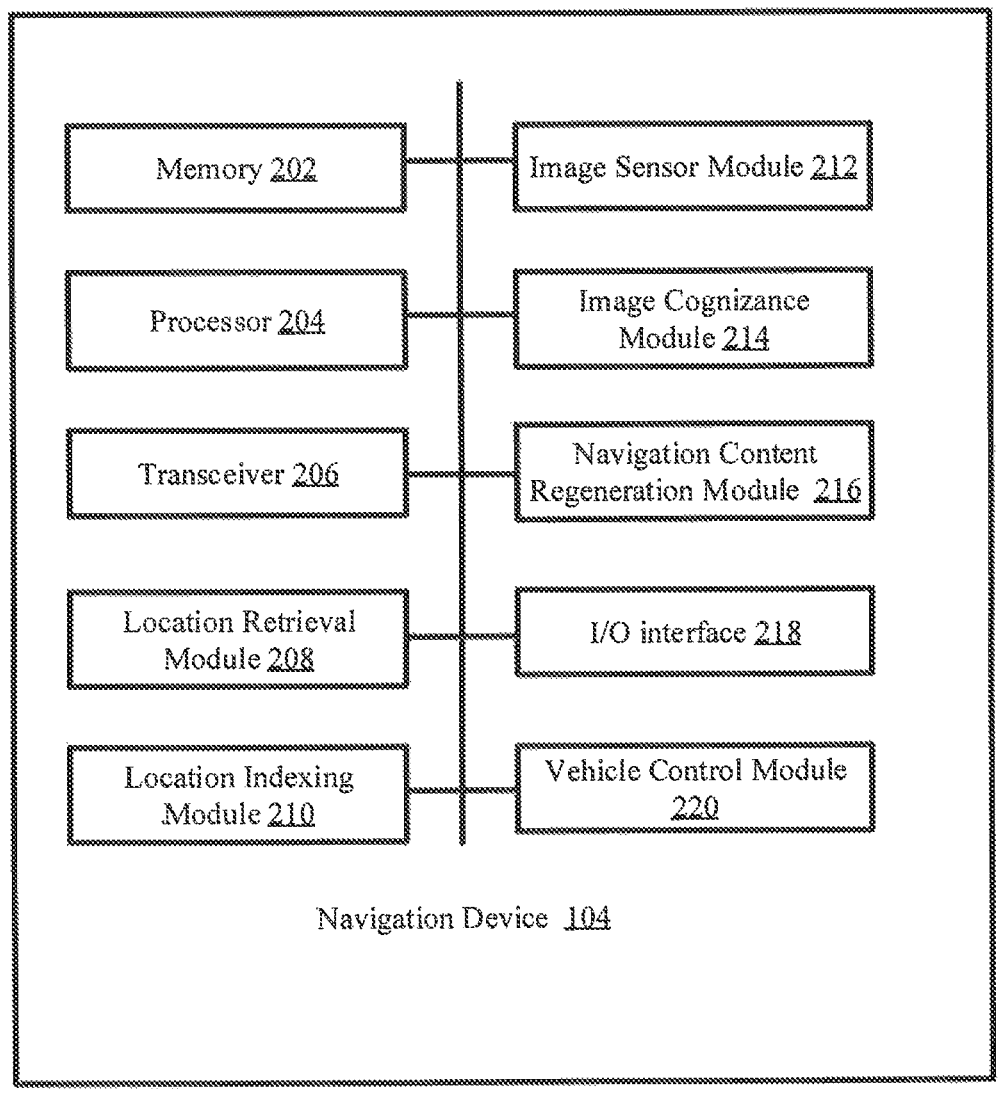
FIG. 2a is a block diagram illustrating a navigation device to control an autonomous vehicle based on a dynamic dictionary in accordance with some embodiments of the present disclosure.

It should be appreciated by those skilled in the art that any block diagrams herein represent conceptual views of illustrative systems or devices embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods, systems and devices may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and the like indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" or "in some embodiments" does not necessarily refer to the same embodiment.

The present invention discloses intelligent identification of navigation content from information-boards or signboards available on roadsides or along a navigation path of a vehicle. In some embodiments, the navigation may be performed by an autonomous vehicle using a dynamic dictionary. Dynamic dictionary is a dictionary created in real-time based on location of the autonomous vehicle. In some embodiments, the dynamic dictionary may be created based on a pre-defined radius from the location of the vehicle or a navigation device as disclosed herein. The dynamic dictionary may comprise data for navigation, associated with the location of the vehicle, data related to navigation retrieved from external sources, and historical location data that may be assimilated based on vehicle location parameters such as latitude, longitude direction of motion of the vehicle, navigation path of the vehicle and the like.

FIG. 1 is a block diagram that illustrates an exemplary environment 100 in which various embodiments of the method may be implemented. The environment 100 may include a vehicle 102 and a navigation device 104 associated with the vehicle 102. The vehicle 102 may be traversing a navigation path 106. The vehicle 102 may be an autonomous car, bus, truck, van, or a two-wheeler. The navigation path 106 may have a plurality of sign boards 108 (for example 108 *a* to 108*d*, as shown in FIG. 1) which may have navigation content. The navigation content may be in alphabets, numeric digits and symbols. In an example, the sign board 108 may contain navigation content such as "One way", "No Parking", "Towards Parking" with an arrow symbol indicating the direction of the parking zone and the like. It may be apparent to a person of ordinary skill in the art that navigation content may include any alphabets, numeric digits and symbols that indicates any information relevant for the purpose of navigation of a vehicle.

The navigation device 104 may communicate with one or more sources of location data 110, represented in the FIG. 1 as source 110*a*, source 110*b* . . . source 110*n* and so on via a communication network. In an example, source 110*a* may be a navigation application of the navigation device 104, source 110*b* may be external sources on the web, such as Google Maps™, Here Maps™, and any cloud-based service hosting location based data and the like. Source 110*n* may be a location-based dictionary created by the navigation device 104. As may be apparent to a person skilled in the art, there may be various other sources of information 110 that may be used to intelligently determine location data having navigation content. The navigation device 104 may collate location data from various sources 110 thereby facilitate in quick and reliable identification of the navigation content. In an example, some location data may not be hosted in the source 110*a* which is the navigation application. In such situation, the navigation device 104 may quickly look into alternate source 110*b* which is the external cloud-based service hosting location based data. Alternatively, some cases when the location data is not available from source 110*b* due to situations like unavailability of server, the navigation device may look in an alternate source like source 110*n* which is the dictionary database. As may be apparent to a person skilled in the art the above-mentioned sources may not be construed to be limiting to the scope of the present disclosure. The navigation device 104 may be capable of retrieving or fetching location data from various alternate sources.

Such communication between the navigation device 104 and one or more sources of location data may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Referring now to FIG. 2*a*, a block diagram of various components within the navigation device 104 is illustrated, in accordance with an embodiment of the present disclosure. The navigation device 104 may be implemented as a variety of portable computing devices, such as, a smartphone, a dedicated handheld device, a tablet, or a phablet. Alternatively, the navigation device 104 may be implemented as a distributed system, such that, few components of the navigation device 104 reside in a portable device, while, other components may reside in a server, which may be located remotely or within a vehicle.

The navigation device 104 may include a memory 202, a processor 204, transceiver 206, location retrieval module 208, location indexing module 210, image sensor module 212, image cognizance module 214, navigation content regeneration module 216, I/O interface module 218 and vehicle control module 220. Each of the components and modules may be communicatively coupled to each other. It will be appreciated that the above components may be represented as a single module/component or a combination of different modules/components. The memory 202 has processor instructions stored thereon, which on execution cause processor 204 to control a vehicle using a dynamic dictionary generated based on location of the vehicle 102. The memory 202 may be configured to store one or more programs, routines, or scripts that may be executed in coordination with the processor 204. In some embodiments the memory 202 includes instructions stored thereon that on execution, cause the processor 204 to create a dynamic dictionary. The memory 202 may be implemented based on a Random Access Memory (RAM), a Read-Only Memory (ROM), a Hard Disk Drive (HDD), a storage server, and/or a Secure Digital (SD) card. The memory 202 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The processor 204 comprises suitable logic, circuitry, and interfaces that may be configured to execute a set of instructions stored in the memory 202. The processor 204 may be implemented based on a number of processor technologies known in the art. Examples of the processor 204 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

In accordance with some embodiments of the invention, the navigation device 104 may receive images as inputs from one or more image-sensing devices. In some embodiments, the image sensor module 212 may be configured to capture images from the surrounding scene for extraction of navigation content along the navigation path 106 of the vehicle 102. The image sensor module 212 may include one or more image sensing devices such as cameras. In some embodiments, the one or more image-sensing devices may be placed on the front side of the vehicle, in order to capture the path region ahead of the vehicle. Additionally, the one or more cameras may be placed in order to meet predefined placement criteria. One such placement criteria is that the image sensing device should be placed with an angle perpendicular to the axis of ground region for proper image capture. In some other embodiments, the one or more image sensing devices may be placed on the side or the roof of the vehicle without limiting the scope of the present disclosure.

While the vehicle 102 is navigating on a navigation path 106, one or more image-sensing devices may capture one or more images of a scene along the navigation path 106. The captured images of the scene are taken as input from the image sensing devices for further processing.

Once the image sensor module 212 captures the images along the navigation path 106, the image cognizance module 214 may recognize and extract navigation content from the images. In some embodiments, the image cognizance module 214 may recognize alphabets, numeric digits and symbols in the images. The image cognizance module 214 may receive the images of the scene captured as input and extract the navigation content from the images. The image cognizance module 214 may perform localization of the alphabets, numeric digits or symbols present in the images. While performing localization, the image cognizance module 214 may detect an area in the image where the navigation content is present. The image cognizance module 214 may pre-process the image and select a boundary for the area having the navigation content. The image cognizance module 214 may crop the selected area for further processing. In an example, the text of the navigation content may be recognized by performing connected text component analysis. The image cognizance module 214 may pre-process the image by performing gamma correction, foreground and background separation in the images of the scene, etc. The pre-processed image may then be provided to an Optical Character Recognition (OCR) engine.

The navigation content is extracted from the images of the scene captured for identification. The navigation content so extracted from the images of the scene is hereinafter referred to as extracted navigation content in some cases. The location retrieval module 208 identifies the location of the vehicle using positioning system such as Global Positioning System (GPS), Globalnaya Navigazionnaya Sputnikovaya Sistema (GLONASS) and the like. The location retrieval module 208 may retrieve the exact latitude and longitude of the vehicle. Further, the location retrieval module 210 may be configured to retrieve the nearest places information by means of Application Program Interfaces (API). In some embodiments, the location may be retrieved up to a pre-defined radius with respect to the position of the vehicle 102. The retrieval of the location data is dynamically changed based on the vehicle location. In an example, if a vehicle is moving in particular direction, then it will adaptively collect forth-coming information of nearby locations and delete the previous information after some threshold distance. This has been explained further in detail in conjunction with FIG. 2b.

Figure 2B:
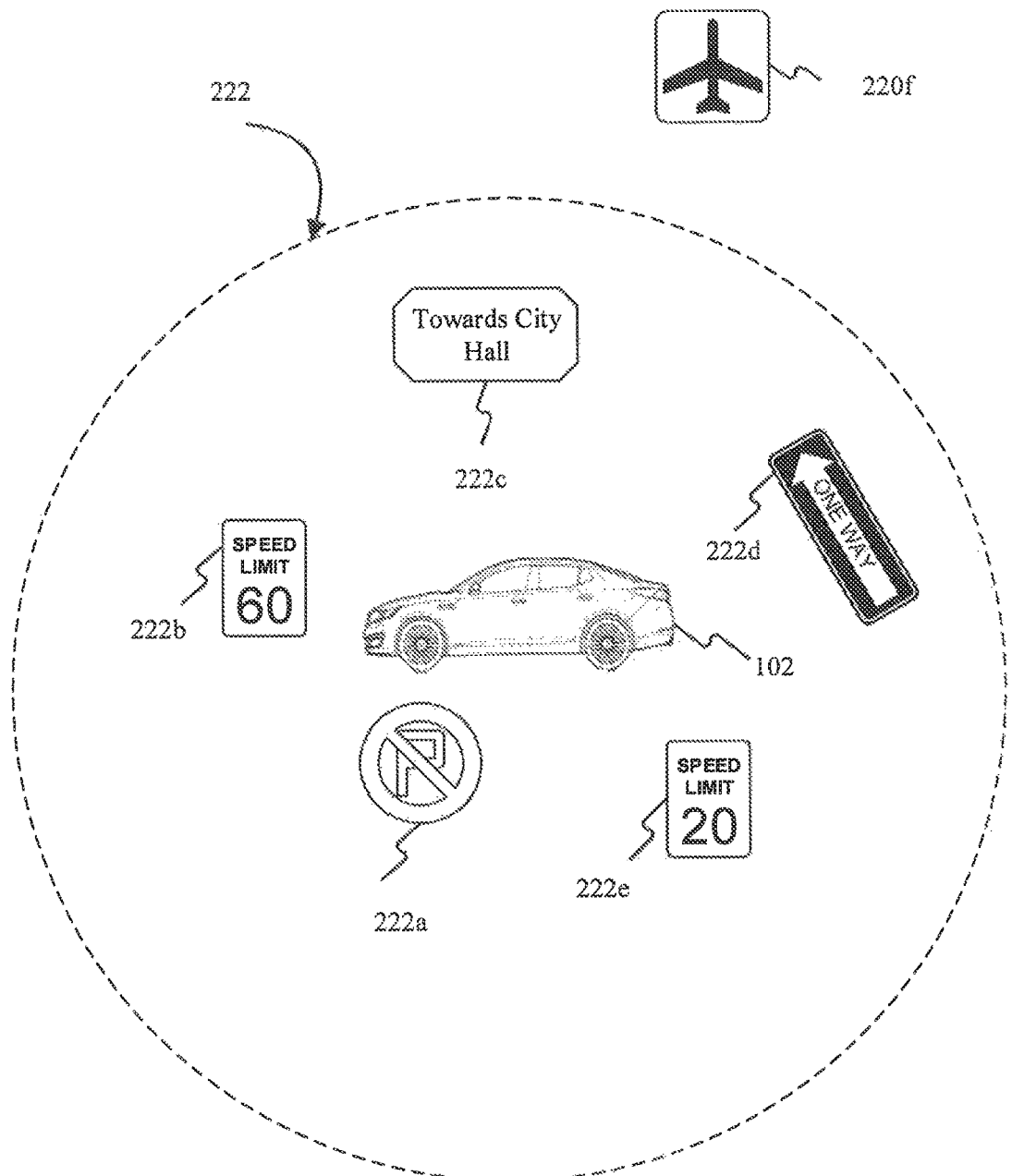
FIG. 2b is an exemplary diagram illustrating retrieval of location data in accordance with some embodiments of the present disclosure.

FIG. 2b illustrates a pictorial representation of the retrieval of location data based on the distance from the vehicle 102 in accordance with an exemplary embodiment of the present disclosure. If, for example, a radius of 100 meters is pre-defined for retrieval of nearest location data, then location information within the 100 meter radius is retrieved. In FIG. 2b, the 100 meter radius boundary is represented as pre-defined radius 220. For the current location of vehicle 102, all the surrounding location data within the circle with the pre-defined radius 220 is extracted with latitude and longitude values. The location data encompassed within the 100 meters radius is added to the dictionary dynamically. The data within 100 meters distance is loaded to the memory 202 and is indexed in increasing order based on the distance of the location data with the location of the vehicle (center of the circle). Referring to FIG. 2b, the location data that is a part of the dynamic dictionary at the current location of the vehicle will be No Parking Sign 222a, Speed Limit 60 sign 222b, Building Information 222c, One Way Sign 222d and Speed Limit 20 sign 222e. However, Airport Sign 222f will not be considered as a content of the dynamic dictionary since it falls beyond the pre-defined radius 222 from the current location of the vehicle. Further, the One Way sign 222d is deleted from the memory 202 once the vehicle moves more than 100 meters away from the One Way sign 222d and it falls outside the radius 222.

The navigation device may include a transceiver 206 as shown in the figure to retrieve the location data from one or more sources 110. The transceiver 206 comprises suitable logic, circuitry, and interfaces that may be configured to retrieve location data from external sources such as 110a, 110 . . . 110n and so on. The transceiver 206 may receive historical location data of the vehicle from a source 110 such as a dictionary database 110n. In some embodiments, the transceiver 206 may receive broadcasted navigation content. The transceiver 206 may also receive location data from external sources based on the location of the vehicle 102. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Text message Service (SMS).

Further, once the location data from source 110 is retrieved by the location retrieval module 208, the dictionary data is collated and indexed by the location indexing module 210. The location indexing module 210 performs location systemization which is a systematic ordering of the location data based on the distance from the current location of the vehicle. The location data retrieved from external sources may include location name, location description which may include one or more navigation content associated with the location such as sign boards, safety information, etc. associated with that location, location distance from the vehicle 102, etc. In some embodiments, content for the dynamic dictionary may be given priority based on the forth-coming locations on the navigation path 106 and recent locations traversed by the vehicle 104. In other embodiments, only the forth-coming or immediate future location information may be included in the dynamic dictionary. In an example, the location data which is 30 meters ahead of the vehicle is given a higher priority than the location data that is 30 meters behind the current position of the vehicle. In some embodiments, the dynamic dictionary may be generated in accordance to the priority. In other words, the content of the dynamic dictionary is selected based on the priority. The priority of each content of the dynamic dictionary may change with the change in the location or direction of the vehicle 102.

In some embodiments, the dynamic dictionary content so generated may be stored in a dictionary database. The location data stored on the dictionary database may be arranged based on the forth-coming/present/past location instead of lexicographical order. This type of systematic ordering of the location data helps in the faster retrieval of content from the dynamic dictionary. In other words, the identification of the navigation content is quicker as the dynamic dictionary has fewer entries to look-up. In some embodiments when the vehicle moves to another location, the previous location data may be deleted from the memory 202 but not from the dictionary database. As may be apparent to a person skilled in the art, the dictionary database may be integrated to the navigation device 104. Alternatively, the dictionary database may be a part of an external source such as a cloud server or any other external storage, which may be accessed by the navigation device 104 via the communication network as described earlier.

The dynamic dictionary thus created based on the location of the vehicle 102 may be used for comparison with the navigation content that is extracted from the images of the scene. In an exemplary embodiment, the navigation content extracted from the images of the scene may be matched with the dynamic dictionary using a function TRACK to count the number of steps required to identify the extracted navigation content with the content in the dynamic dictionary. The term "TRACK" is a function used in the process of regeneration of the extracted navigation content by comparing with the dynamic dictionary for identification of the extracted navigation content. This function will count how many steps are required to identify the navigation content by matching the extracted navigation content with an entry of dynamic dictionary.

The navigation content regeneration module 216 may perform TRACK prediction by which, how many times each TRACK is visited by the autonomous vehicle is computed. The navigation content regeneration module 216 may assign confidence values to each of the content of the dynamic dictionary based on the TRACKs. Assigning confidence values for each content of the dynamic dictionary generated will help in identifying the navigation content accurately. In accordance with some embodiments, a content with maximum confidence and minimum distance may be given a high priority in selecting the content from the dynamic dictionary as a match to the extracted navigation content. Assigning of confidence values with TRACKs and identification of navigation have been explained further in detail in conjunction with FIG. 4.

On identifying the navigation content after comparing with the dynamic dictionary, the navigation content is sent to the vehicle control module 220 of the vehicle 102 to make decisions for navigation of vehicle 102. The vehicle control module 220 may control the vehicle based on the navigation content. In some embodiments I/O interface 218 may be configured to provide an output to the user of the vehicle 102, the navigation content that has been identified based on comparing the navigation content from the image captured by the navigation device 104 with the dynamic dictionary that is generated based on a location of the vehicle. The Input/Output (I/O) interface 218 comprises suitable logic, circuitry, and interfaces that may be configured to receive an input or provide an output. The input/output interface 218 comprises various input and output devices that are configured to communicate with the processor 204. Examples of the input devices include, but are not limited to, a keyboard, a mouse, a joystick, a touch screen, a microphone, and/or a docking station. Examples of the output devices include, but are not limited to, a display screen and/or a speaker. In an embodiment, the I/O interface 218 may work in conjunction with the user interface to provide the user an interface for providing inputs and to receive outputs. The I/O interface 218 may be configured to receive inputs from the user that may override a decision made by the navigation device 104. Further, I/O interface 218 may be configured to provide various options of choice to a user to select navigation content based on the dynamic dictionary. The I/O interface 218 may be further configured to receive an accuracy rating from the user for the navigation content that is identified based on the dynamic dictionary.

Figure 3:
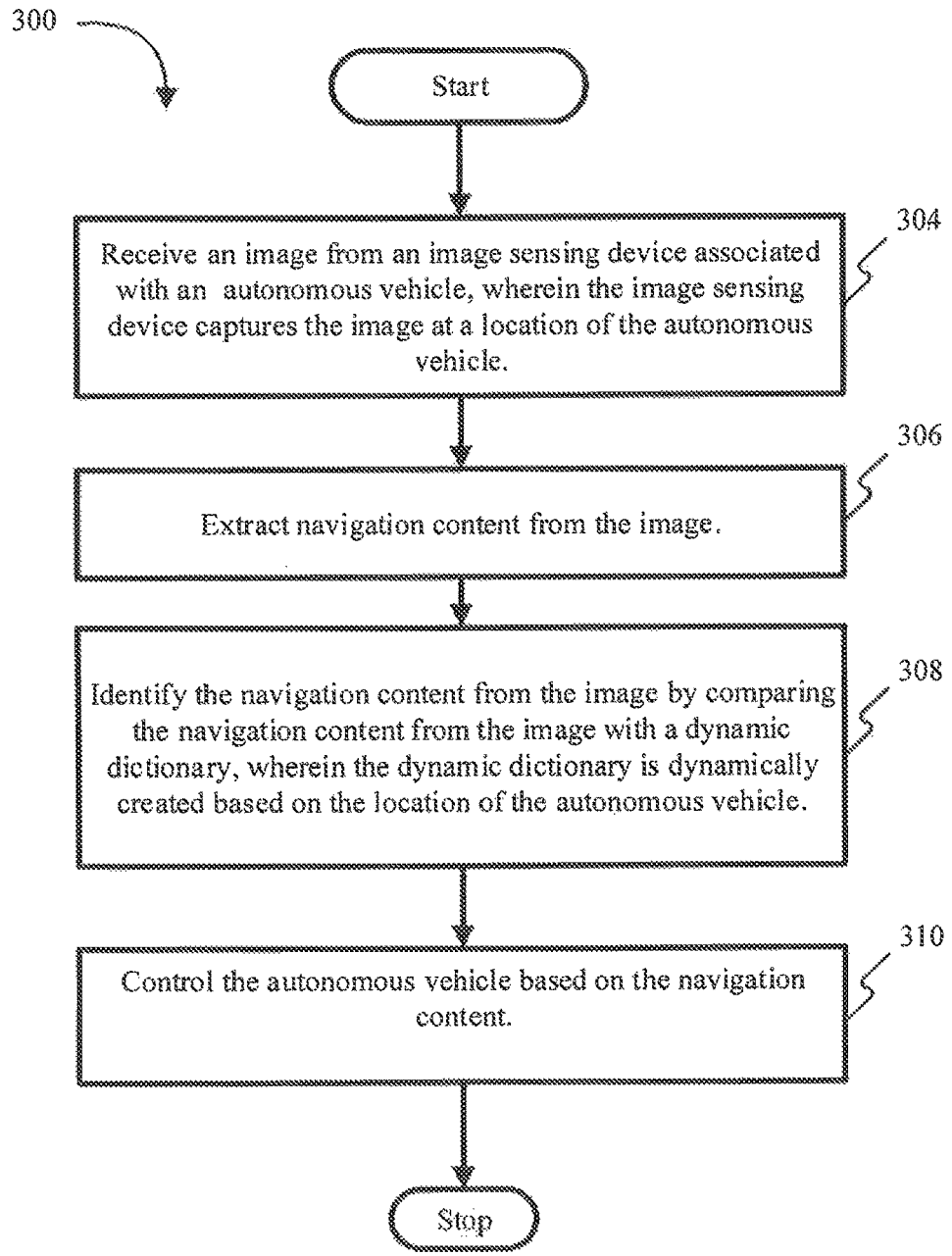
FIG. 3 is a flowchart illustrating a method of controlling an autonomous vehicle in accordance with some embodiments of the present disclosure.

FIG. 3 shows a flowchart illustrating a method of controlling an autonomous vehicle, by the navigation device, in accordance with some embodiments of the present disclosure. As illustrated in FIG. 3, the method 300 includes one or more blocks illustrating a method of controlling an autonomous vehicle, by the navigation device 104. The method 300 may be described in the general context of computer executable instructions. Generally, computer executable instructions can include routines, programs, objects, components, data structures, procedures, modules, and functions, which perform functions or implement abstract data types. The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At step 304, the method 300 may include receiving, by the navigation device 104, an image from an image-sensing device associated with the vehicle 102. The image is captured by the image-sensing device at a location of the autonomous vehicle. Capturing the image by the image-sensing device is described in detail in conjunction with FIG. 2a. After capturing the image, navigation content may be extracted from the image at step 306.

At step 308, the method may include identifying the navigation content from the image. The navigation content may be identified by comparing the navigation content extracted from the image with a dynamic dictionary. The dynamic dictionary is dynamically created based on the location of the autonomous vehicle. In some embodiments, the method may identify the navigation content by comparing the combination of the symbol and the text with the dynamic dictionary that is automatically generated based on the location of the vehicle. At block 310, the method may include controlling the autonomous vehicle based on the navigation content.

Figure 4:
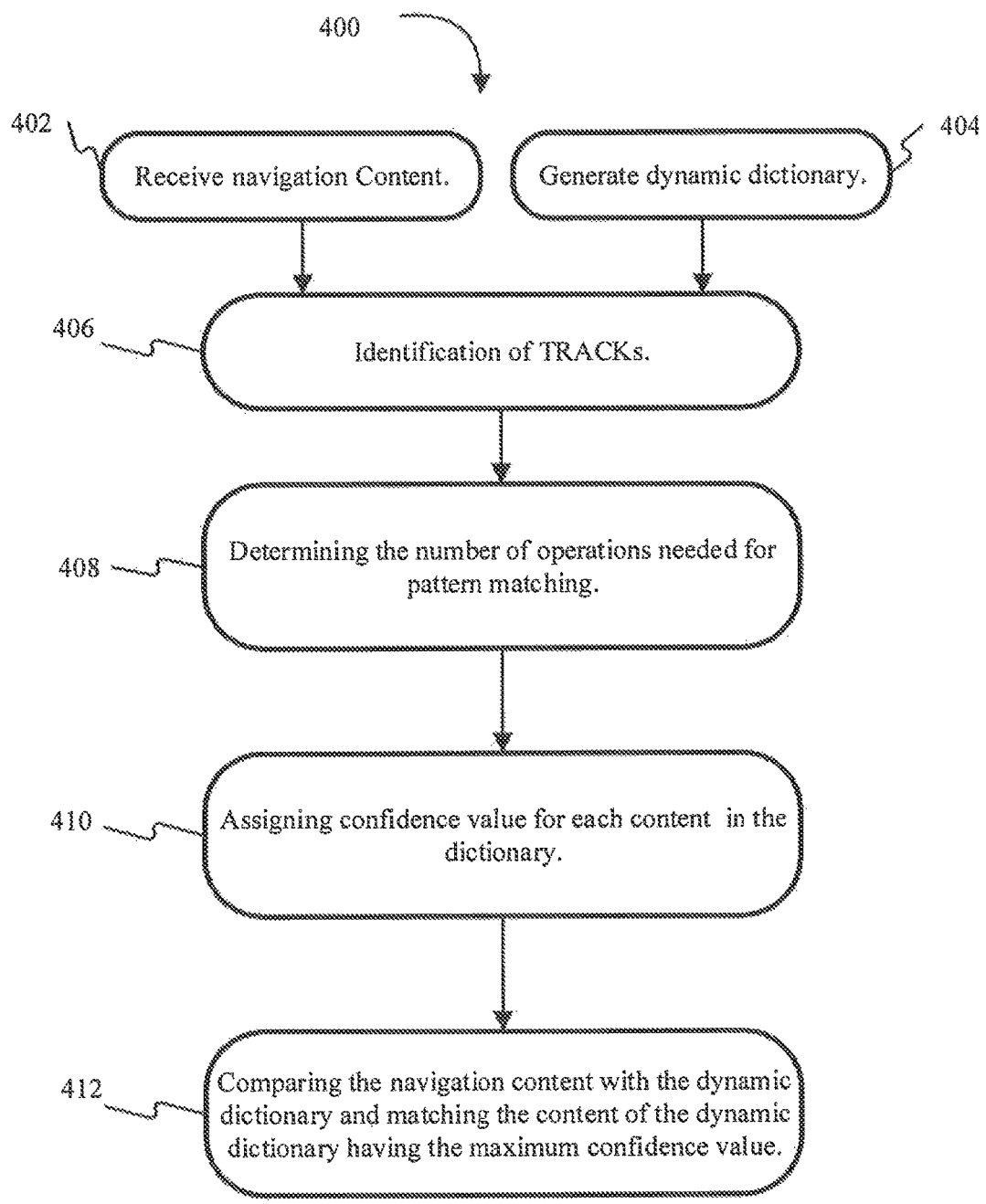
FIG. 4 is a flowchart illustrating comparing a navigation content, extracted from an image, with a dynamic dictionary.

FIG. 4 illustrates a flowchart illustrating an exemplary method of comparing the navigation content extracted from an image with a dynamic dictionary in accordance with some embodiments of the present disclosure. At block 402 the extracted navigation content may be received by the navigation content regeneration module 216. At block 404, a dynamic dictionary generated based on the location of the vehicle is considered by the navigation content regeneration module 216. At block 406, the TRACKs are identified. In an example, TRACKs may be TRACK 1: Update; TRACK 2: Erase; and TRACK 3: Add. TRACK 1 being an Update TRACK has the function to update the given alphabets, numeric digits and symbols which may include strokes for symbols to match with the content of the dynamic dictionary. TRACK 2 being an Erase TRACK has the function to alphabets, numeric digits and symbols including strokes for symbols in the given navigation content to get a match of the content of the dynamic dictionary. TRACK 3 being an Add TRACK has the function of adding alphabets, numeric digits and symbols including strokes for symbols to the extracted navigation content to get match with the content in the dynamic dictionary.

Next, at block 408 the number of operations needed for pattern matching of the navigation content with the dynamic dictionary is determined. During the pattern matching, the extracted navigation content is compared or matched against content sourced from the dynamic dictionary with operations like update, erase and add for updating, removal and addition of alphabets, numerical digits or symbols including strokes for symbols, for the identification of the navigation content. At step 410, based on the number of operations each content or entry of the dynamic dictionary is assigned a confidence value. In this step, the extracted navigation content is taken as input and it is matched with the content in the dynamic dictionary. Thus, the navigation content which takes less operation to match with a content of the dynamic dictionary may be given more confidence value and vice versa. Thus, the word with more confidence value will be matched to the extracted navigation content.

$$\text{Confidence value } (A) = (MC(A) - (TRACK1(A) + TRACK1(A) + TRACK3(A)))/LW(A)$$

Where, MC (A) represents the number of common character between the text in the navigation content and the content of the dynamic dictionary; TRACK1 (A) represents the how many times update track is visited; TRACK2 (A) represents the how many times erase TRACK is visited; TRACK3 (A) represents the how many times add TRACK is visited; and LW (A) represents the length of the content of the dynamic dictionary that is being compared with. Further, the process of assignment of confidence value to the dictionary content has been shown by way of examples.

In an example, let the extracted navigation content be a text, such as "port". The dynamic dictionary generated based on the location may be as shown below in Table 1:—
Dictionary Content:

TABLE 1

| Location Data | Distance (in Meters) |
|---|---|
| Depart | 5 |
| Sport | 9 |
| Airport | 10 |

If the navigation content extracted by the recognition module is the word "port", then it will be sent to the navigation content regeneration module 216. It will try to regenerate the recognized text with the dynamic dictionary. In an example, the dynamic dictionary has words like "depart", "sport" and "airport". In an example, to identify "depart" from "port", the navigation content regeneration module 216 will need to update the letter 'o' to 'a' and then add letters 'd' and 'e' to get the word "depart". The total number of steps or TRACKs used in this example is 3. Based on the number of steps of TRACKs used, the confidence value for the word "depart" in the dynamic dictionary would be calculated. In a similar manner the steps of update, add and delete would also be tried to other words in the dynamic dictionary like "sport" and "airport" and the confidence value may be predicted for each of the content based on the required number of TRACK visits to create a match.

At step 412, the content of the dynamic dictionary which has maximum confidence value would be matched for the partially extracted navigation content with is in this example, the word "port". For example, the confidence vale for the word "sport" with respect to the extracted text "port" is predicted to be 0.6 as shown below:—
The content "sport" in the dynamic dictionary is recognized after one time use of TRACK 3 i.e. ADD TRACK.

$MC(A)=4$ $TRACK1(A)=0$ $TRACK2(A)=0$ $TRACK3(A)=1$ $LW(A)=5$

Since Confidence (A)=(MC(A)−(TRACK 1(A)+TRACK1(A)+TRACK3(A)))/LW(A); the Confidence=(4−(0+0+1))/5=0.60; Similarly, for the dynamic dictionary content "Airport" the extracted navigation content "port" would need the use of TRACK 3 i.e. ADD TRACK three times to match with Airport.
Here:

$MC(A)=4$ $TRACK1(A)=0$ $TRACK2(A)=0$ $TRACK3(A)=3$ $LW(A)=5$

Confidence=(4−(0+0+3))/7=0.14

Likewise, the confidence value of symbols and numerical digits can also be determined by matching strokes as would be known to a person skilled in the art.

The number of TRACK visits will increase the likelihood of relevant navigation content match and result in increased confidence values and vice versa. Further, the assignment of the confidence values may be used to identify the common patterns of the extracted navigation content with the content of the dynamic dictionary and thereby recognize the navigation content. The navigation content is compared to the dynamic dictionary based on the assigned confidence value to each content of the dynamic dictionary. The content with the highest confidence value is selected as a match for the navigation content and hence the extracted navigation content is identified. In the example, as explained with reference to FIG. 4, since the word "sport" has the highest confidence value the extracted navigation content is identified to be "sport". The described method hence enables identification of navigation content that may be partially captured due to conditions such as motion blurring of the images, low lighting conditions, weather conditions and the like.

In some embodiments, if the confidence values of more than one contents of the dynamic dictionary is same then the navigation content may be matched based on distance of the content of the dynamic dictionary from the location of the vehicle. In some embodiments, the navigation content may be matched based on the direction of movement of the vehicle. In some embodiments, when two or more navigation in the dynamic dictionary have the same confidence value and same distance from the location of the vehicle the content of the dynamic dictionary that is present in forthcoming path of the vehicle may be matched with the extracted navigation content and identified to be the navigation content.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Computer System

FIG. 5 illustrates a block diagram of an exemplary computer system for implementing embodiments consistent with the present disclosure. Variations of computer system 501 may be used for controlling an autonomous vehicle using location based dynamic dictionary. The computer system 501 may comprise a central processing unit ("CPU" or "processor") 502. The processor 502 may comprise at least one data processor for executing program components for executing user-generated or system-generated requests. A user may include a person, a person using a device such as those included in this disclosure, or such a device itself. The processor 502 may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices referred in the FIG. 5 as Memory 515 (e.g., RAM 513, ROM 514, etc.) via a storage interface 512. The storage interface 802 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser 518 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server 519 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server 519 may utilize communication protocols such as internet text message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client 520 may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described method and device for controlling an autonomous vehicle using location based dynamic dictionary. The illustrated steps are set out to explain the exemplary embodiments shown, and it should be anticipated that ongoing technological development will change the manner in which particular functions are performed. These examples presented herein are for purposes of illustration, and not limitation. Further, the boundaries of the functional building blocks or modules have been arbitrarily defined herein for the convenience of the description. Alternative boundaries or modules can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The present invention is based on controlling of autonomous vehicles. Most of these advantages flow from the fact that a location-based dynamic dictionary is being created for identification of navigation content available on the signboards and information boards along navigation path or roads used by vehicles.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components or modules in communication with each other does not imply that all such components are required. On the contrary, a variety of optional components or modules are described to illustrate the wide variety of possible embodiments of the invention.

The language used in the specification has been principally selected for readability and instructional purposes, and it may not have been selected to delineate or circumscribe the inventive subject matter. It is therefore intended, that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the devices, systems, modules, and sub-modules have been illustrated and explained to serve as examples and should not be considered limiting in any manner. It will be further appreciated that the variants of the above disclosed device elements, system elements, modules, and other features and functions, or alternatives thereof, may be combined to create other different devices, systems or applications.

Those skilled in the art will appreciate that any of the aforementioned steps, device modules and/or system modules may be suitably replaced, reordered, or removed, and additional steps, device modules and/or system modules may be inserted, depending on the needs of a particular application. In addition, the system or devices of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

We claim:

1. A method of controlling an autonomous vehicle, the method comprising:
   receiving, by a navigation device, an image from an image sensing device associated with the autonomous vehicle, wherein the image sensing device partially captures the image at a current location of the autonomous vehicle due to conditions that include one of motion blurring of the image, low lighting conditions, and weather conditions;
   extracting, by the navigation device, navigation content from the partially-captured image;
   regenerating, by the navigation device, the navigation content by comparing the navigation content from the partially-captured image with each one of look-up entries in a dynamic dictionary, wherein the dynamic dictionary is dynamically created based on surrounding location data within a pre-defined radius from the current location of the autonomous vehicle; and
   controlling, by the navigation device, the autonomous vehicle based on the regenerated navigation content.

2. The method as claimed in claim 1, wherein extracting the navigation content from the partially-captured image comprises isolating the navigation content in the image.

3. The method as claimed in claim 1, wherein the navigation content comprises at least one of alphabets, numeric digits and symbols.

4. The method as claimed in claim 1, wherein the dynamic dictionary comprises text data associated with the current location of the autonomous vehicle, the surrounding location data retrieved from external sources, and historical location data.

5. The method as claimed in claim 1, further comprising, updating the dynamic dictionary associated with the current location of the autonomous vehicle based on the navigation content.

6. The method as claimed in claim 1, wherein comparing the navigation content from the partially-captured image with the dynamic dictionary comprises pattern matching the navigation content with the dynamic dictionary.

7. The method as claimed in claim 1, further comprising determining a confidence score based on comparing the navigation content from the partially-captured image with the dynamic dictionary.

8. A navigation device, to control an autonomous vehicle based on a dynamic dictionary, the navigation device comprising:
   a processor; and
   a memory communicatively coupled to the processor, wherein the memory stores processor instructions, which, on execution, causes the processor to:
   receive an image from an image sensing device associated with the autonomous vehicle, wherein the image sensing device partially captures the image at a current location of the autonomous vehicle due to conditions that include one of motion blurring of the image, low lighting conditions, and weather conditions;
   extract navigation content from the partially-captured image;
   regenerate the navigation content by comparing the navigation content from the partially-captured image with each one of look-up entries in a dynamic dictionary, wherein the dynamic dictionary is dynamically created based on surrounding location data within a pre-defined radius from the current location of the autonomous vehicle; and control the autonomous vehicle based on the regenerated navigation content.

9. The navigation device of claim 8, wherein extracting the navigation content from the partially-captured image comprises isolating the navigation content in the image.

10. The navigation device of claim 8, wherein the navigation content comprises at least one of numeric digits, alphabets, and symbols.

11. The navigation device of claim 8, wherein the dynamic dictionary comprises text data associated with the current location of the autonomous vehicle, the surrounding location data retrieved from external sources, and historical location data.

12. The navigation system of device 8, further comprising, updating the dynamic dictionary associated with the current location of the autonomous vehicle based on the navigation content.

13. The navigation device of claim 8, wherein comparing the navigation content from the partially-captured image with the dynamic dictionary comprises pattern matching the navigation content with the dynamic dictionary.

14. The navigation device of claim 8, further comprising determining a confidence score based on comparing the navigation content from the partially-captured image with the dynamic dictionary.

15. A non-transitory computer-readable storage medium having stored thereon, a set of computer-executable instructions for causing a computer comprising one or more processors to perform steps comprising:

receiving an image from an image sensing device associated with the autonomous vehicle, wherein the image sensing device partially captures the image at a current location of the autonomous vehicle due to conditions that include one of motion blurring of the image, low lighting conditions, and weather conditions;

extracting navigation content from the partially-captured image;

regenerating the navigation content by comparing the navigation content from the partially-captured image with each one of look-up entries in a dynamic dictionary, wherein the dynamic dictionary is dynamically created based on surrounding location data within a pre-defined radius from the current location of the autonomous vehicle; and controlling the autonomous vehicle based on the regenerated navigation content.

16. The method as claimed in claim 1, wherein regenerating, by the navigation device, the navigation content by comparing the navigation content from the partially-captured image with a dynamic dictionary, comprises:

performing pattern matching of the navigation content extracted from the partially-captured image with each one of the look-up entries in the dynamic dictionary;

identifying a content of the dynamic dictionary, which has a common pattern as that of the navigation content extracted from the partially-captured image, based on the pattern matching; and regenerating the navigation content by updating, removing and/or adding of at least one portion of the navigation content extracted from the partially-captured image, based on the identified content of the dynamic dictionary.

17. The method as claimed in claim 1, wherein, in the dynamic dictionary, the surrounding location data encompassed within the pre-defined radius is indexed in an increasing order based on the distance of each of the surrounding location data from the center of the current location of the autonomous vehicle.

* * * * *